United States Patent
Letsu-Dake et al.

(10) Patent No.: US 10,741,084 B2
(45) Date of Patent: Aug. 11, 2020

(54) SYSTEM AND METHOD FOR ENHANCING THE INTERACTIVE TRANSMISSION AND VISUALIZATION OF FLIGHT DATA IN REAL-TIME

(71) Applicant: Honeywell International Inc., Morris Plains, NJ (US)

(72) Inventors: Emmanuel Letsu-Dake, Shakopee, MN (US); Lindsey C. Tschetter, Scottsdale, AZ (US); Christopher J. Hamblin, Lee's Summit, MO (US); Orin Jon Kelley, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 56 days.

(21) Appl. No.: 16/019,035

(22) Filed: Jun. 26, 2018

(65) Prior Publication Data

US 2019/0130767 A1    May 2, 2019

Related U.S. Application Data (60) Provisional application No. 62/580,746, filed on Nov. 2, 2017.

(51) Int. Cl.
*G08G 5/00* (2006.01)
*G07C 5/08* (2006.01)
(Continued)

(52) U.S. Cl.
CPC ............. *G08G 5/0021* (2013.01); *B64F 5/60* (2017.01); *G01C 23/00* (2013.01); *G07C 5/008* (2013.01);
(Continued)

(58) Field of Classification Search
None
See application file for complete search history.

(56) References Cited

U.S. PATENT DOCUMENTS

| | | |
|---|---|---|
| 6,208,955 B1 | 3/2001 | Provan et al. |
| 8,019,447 B2 | 9/2011 | Hoisington et al. |
| | (Continued) | |

FOREIGN PATENT DOCUMENTS

BR      PI1000067 A2    8/2011

OTHER PUBLICATIONS

European Search Report issued in related EP application No. 18 20 3895, dated Mar. 4, 2019 (8 pages).
(Continued)

*Primary Examiner* — Abdhesh K Jha
(74) *Attorney, Agent, or Firm* — Bookoff McAndrews, PLLC (57) ABSTRACT

A system, method and an avionics subsystem are disclosed. For example, the system includes a data transmitter configured to transmit flight data associated with an airborne vehicle in real-time, a flight deck associated with the airborne vehicle and configured to exhibit a response to the flight data, and a transceiver coupled to the data transmitter and configured to receive and re-transmit the flight data in real-time. The system further includes a processing system coupled to the transceiver and configured to receive and re-transmit the flight data in real-time, and a flight simulator coupled to the processing system and configured, in response to the flight data, to replicate the exhibited response of the flight deck in real-time.

17 Claims, 4 Drawing Sheets

(51) Int. Cl.
    *B64F 5/60*          (2017.01)
    *G07C 5/00*         (2006.01)
    *G01C 23/00*       (2006.01)

(52) U.S. Cl.
    CPC ......... *G07C 5/0808* (2013.01); *G08G 5/0013* (2013.01); *G07C 5/0816* (2013.01); *G07C 5/0841* (2013.01)

(56) References Cited

U.S. PATENT DOCUMENTS

| | | |
|---|---|---|
| 8,616,884 B1 | 12/2013 | Lechner et al. |
| 2003/0003872 A1 | 1/2003 | Brinkley et al. |
| 2003/0065428 A1 | 4/2003 | Mendelson et al. |
| 2007/0088467 A1 | 4/2007 | Knotts |
| 2015/0302756 A1 | 10/2015 | Guehring et al. |
| 2016/0036513 A1 | 2/2016 | Klippert et al. |
| 2016/0176538 A1 | 6/2016 | Bekanich |
| 2017/0294135 A1 | 10/2017 | Lechner |

OTHER PUBLICATIONS

Gulf Helicopters, "Training Devices", "Gulf Helicopters—Training Academy", "http://www.gulfhelicopters.com/en/home.html", Dated 2018, pp. 1-5.

FIG. 4

SYSTEM AND METHOD FOR ENHANCING THE INTERACTIVE TRANSMISSION AND VISUALIZATION OF FLIGHT DATA IN REAL-TIME

CROSS REFERENCE TO RELATED APPLICATIONS

This application is related to U.S. Provisional Patent Application Ser. No. 62/580,746 (Attorney docket number H0063414-5883) entitled "INTERACTIVE REAL-TIME AIRCRAFT DATA TRANSMISSION AND VISUALIZATION SYSTEM AND METHOD," filed on Nov. 2, 2017 and incorporated herein by reference.

BACKGROUND

Avionics systems include all of the electronic systems, components and instrumentation onboard airborne vehicles (e.g., aircraft, satellites, and spacecraft) that flight crews utilize for communications, navigation, weather tracking, collision avoidance, and the like. Avionics systems also include other onboard electronic systems that control, monitor and display critical operational and air safety parameters, such as, for example, flight and engine performance. As such, avionics systems must be capable of operating reliably and consistently throughout the entire in-flight missions of the airborne vehicles involved.

Nevertheless, the possibility exists that an onboard avionics' electronic system, component or instrument can fail during a flight. If the failure affects the operational performance of a vehicle such as an aircraft, the flight crew may be required to land the aircraft so that the ground-based maintenance personnel (e.g., customer support staff or CSS) can gain access to the avionics' data onboard the aircraft in order to accurately diagnose and resolve the problem. Unfortunately, this requirement to land the aircraft can cause significant scheduling problems with substantially increased operational and maintenance costs for the civil and governmental aviation entities (large or small) involved. Also, this requirement creates an undesirable operational issue referred to as an aircraft on ground (AOG) situation.

Notably, flight crews are often required to assist the CSS with troubleshooting in-flight maintenance problems by communicating directly with the CSS and describing the problems in real-time. However, this requirement substantially increases the flight crew's workload since the crew members must maintain their primary functions (e.g., aviation, navigation and communications) while simultaneously interacting with the CSS. For example, the CSS may instruct the crew members to describe their observations of the current maintenance problem in detail, attempt to recall any similar maintenance problems that occurred in the past, and provide their impression of the state of the flight deck avionics prior to the interaction with the CSS. Furthermore, while diagnosing a problem during a flight, the CSS may instruct the flight crew to perform certain maintenance tasks and describe the resulting effects. Unfortunately, however, the accuracy of the descriptive information that can be provided during the interactive, voice communications between the CSS and the flight crews is often limited significantly by one or more of a plurality of common voice communication hindrances such as, for example, heavily accented speech, language barriers, omissions of critical information, miscommunications, intermittent communications media (e.g., satellite communications), and the like. Consequently, the descriptive information provided during interactive, voice communications between flight crews and ground-based maintenance personnel can be misinterpreted and the problem or fault misdiagnosed as a result.

For the reasons stated above and for other reasons stated below which will become apparent to those skilled in the art upon reading and understanding the specification, there is a need in the art for systems and methods that can resolve issues with avionics in-flight, which are less burdensome on flight crews while providing accurate resolutions of the issues.

SUMMARY

A real-time data streaming and visualization system is provided for ground-based CSS to diagnose and resolve equipment failures or maintenance issues in-flight or immediately upon landing. The system enables the CSS to visualize in real-time the flight deck avionics as seen by the flight crew and thereby enhance the accuracy of the diagnoses when the failure or maintenance issue is first observed.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout the figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
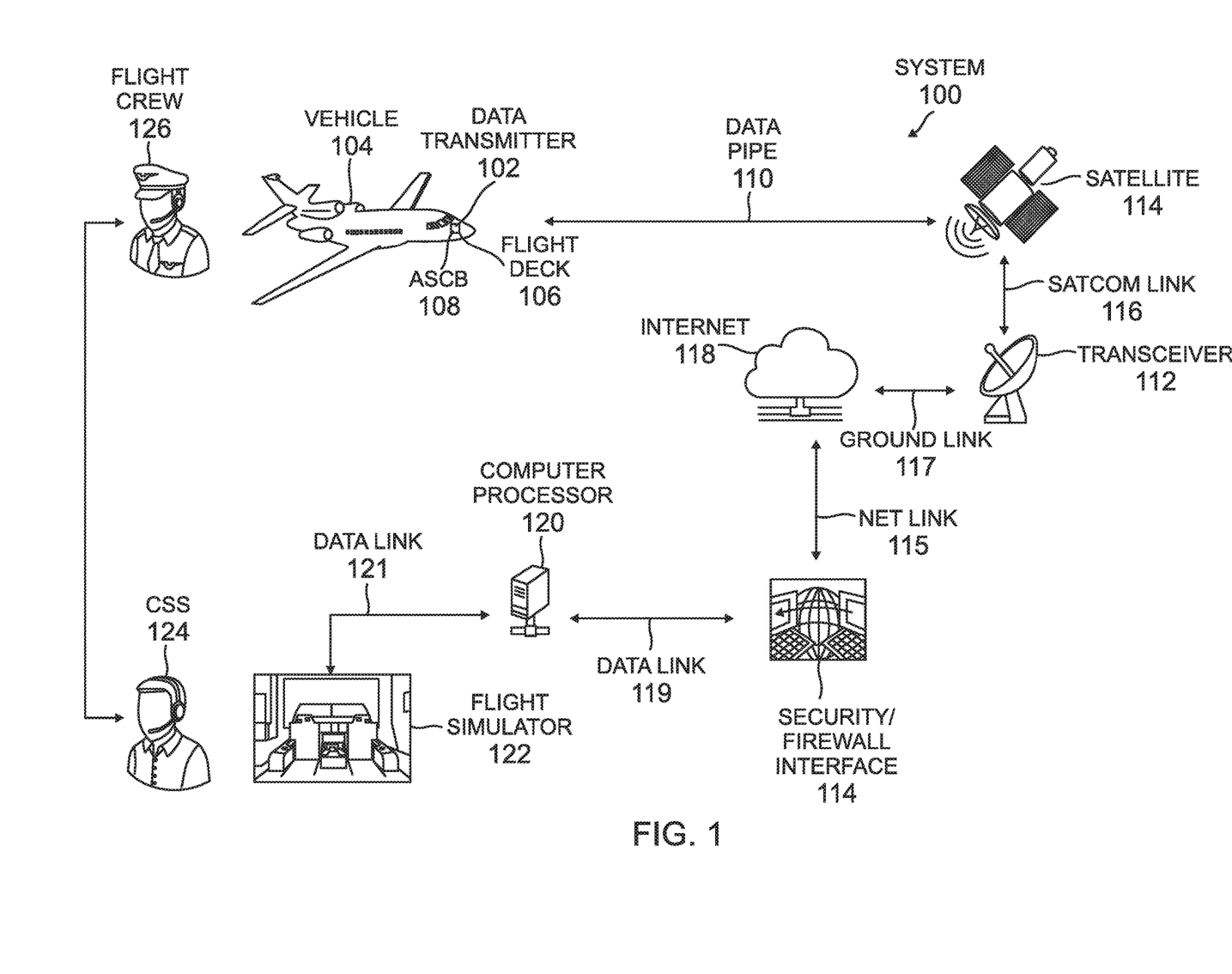
FIG. 1 is a functional block diagram illustrating a system that can be utilized to implement one example embodiment of the present invention.

FIG. 1 is a functional block diagram illustrating a system 100, which can be utilized to implement one example embodiment of the present invention. For example, in one embodiment, the system 100 can be utilized to enhance the interactive transmission and visualization of flight data in real-time. (Note that, in this context, the term "real-time" means that flight data is transmitted, received and processed within milliseconds so that it can be viewed virtually immediately by a recipient.) In some embodiments, the system 100 can be utilized by ground-based maintenance personnel to visualize downlinked flight deck avionics system data during flights. In some embodiments, the system 100 can be utilized by CSS to troubleshoot maintenance problems or faults in aircraft in real-time during flights or while landing.

Referring to FIG. 1, the exemplary system 100 includes a data transmitter 102 onboard an airborne vehicle 104. Although the airborne vehicle 104 is depicted as an aircraft in this embodiment, the airborne vehicle 104 can also be, for example, a spacecraft or a satellite in flight. In other words, the airborne vehicle 104 is not intended to be limited to a specific type of vehicle and can be implemented, for example, utilizing any suitable land-based vehicle (e.g., automobile, truck, bus, train), water-based vehicle (e.g., ship at sea, cruiser, boat, naval vessel), or autonomous vehicle (e.g., self-driven land-borne, airborne or water-borne vehicle). In any event, for this embodiment, the data transmitter 102 is coupled to and in operable communication with a flight deck 106 of the airborne vehicle 104. The flight deck 106 implements numerous control, monitoring, communication and navigation functions of the airborne vehicle 104. As such, the flight deck 106 can receive and generate various data associated with the functions of the airborne vehicle 104, and exhibit a response to at least some of this data.

The data transmitter 102 is configured to transmit, in real-time, at least a portion of the data associated with the control or performance functions of the airborne vehicle 104. In this regard, for this example embodiment, the data transmitter 102 is coupled to and in operable communication with the flight deck 106 via an aircraft standard communication bus (ASCB) 108. Note that although an ASCB (108) is utilized for communications in this exemplary embodiment, the present invention is not intended to be limited only to an ASCB. For example, any suitable vehicle communications bus (e.g., an aircraft communications bus or ACB) can be utilized for operable communications between the data transmitter 102 and the flight deck 106. As such, the vehicle data that is transmitted by the data transmitter 102 includes various vehicle data and flight parameter data. For example, in one embodiment, the vehicle data can be stored in a configuration file and prioritized into tiers based on criticality to support algorithms for transmission priority and data display, and also based on the current state of one or more of the components of the flight deck 106.

Figure 2:
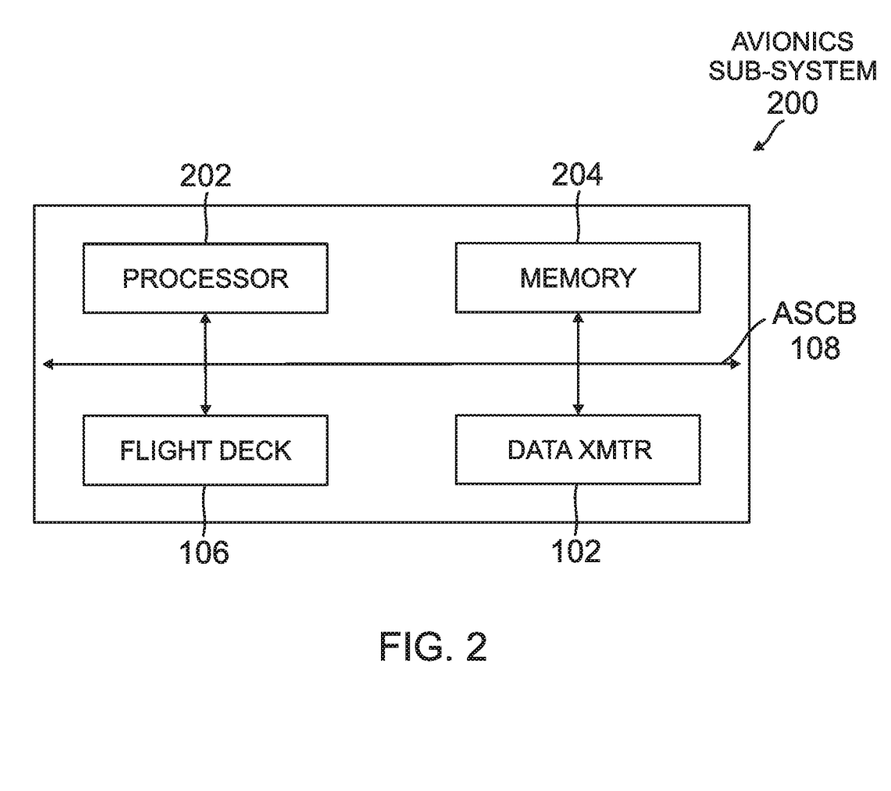
FIG. 2 is a functional block diagram of an avionics subsystem onboard the airborne vehicle depicted in FIG. 1

For ease of understanding, it is helpful to refer now to FIG. 2, which is a functional block diagram of an avionics subsystem 200 onboard the airborne vehicle 104 depicted in FIG. 1. For example, in one embodiment, the avionics subsystem 200 includes an onboard data processor 202 configured to monitor the flight deck 106, and in response to the current state of the flight deck 106, intelligently select a subset of all of the available vehicle data on the ASCB 108 for transmission and storage. In some embodiments, the selection criteria can be based, for example, upon a priori knowledge of the vehicle data that was useful in diagnosing and troubleshooting previous failures or maintenance problems with the same or substantially similar symptoms. Notably, in some embodiments, the data processor 202 and its associated functionality can be a separate component, or the data processor 202 can be incorporated into the data transmitter 102 or the flight deck 106 depicted in FIG. 1.

Figure 3:
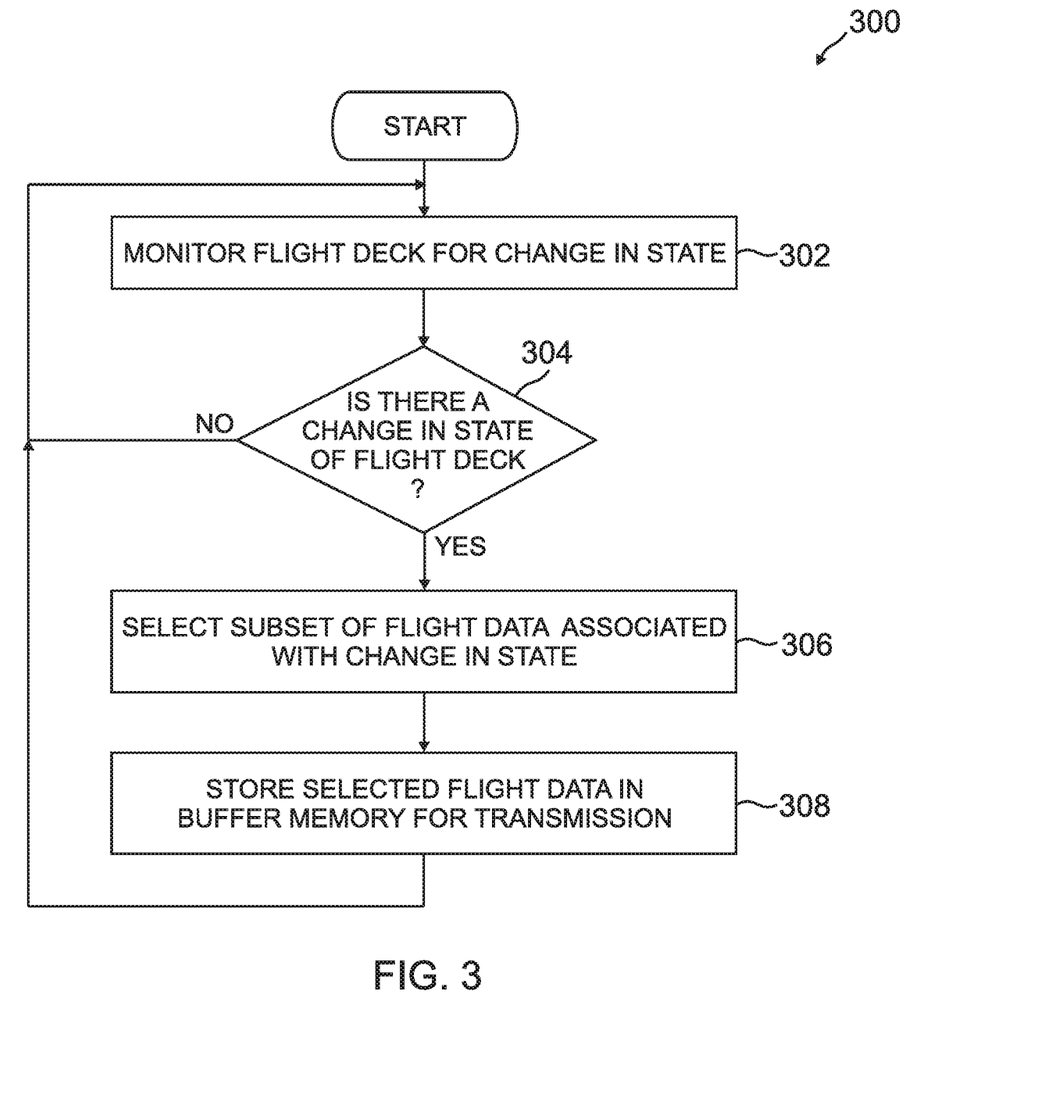
FIG. 3 is a flow diagram illustrating a method that can be utilized to implement one example embodiment of the present invention.

FIG. 3 is a flow diagram illustrating a method 300, which can be utilized to implement one example embodiment of the present invention. For example, the method 300 can be utilized to implement the data processor 202 depicted in FIG. 2. Referring to FIGS. 1-3 for this exemplary embodiment, the method 300 begins by the data processor 202 monitoring the flight deck 106 for a change in its current state (302). Next, if the data processor 202 determines that a change in the state of the flight deck 106 has occurred (304), the data processor selects from the ASCB 108 a subset of the vehicle data associated with the change in the state of the flight deck that occurred (306). The data processor 202 then stores the selected subset of vehicle data in a buffer memory (308) for subsequent transmission by the data transmitter 102. The flow then returns to (302) in order to continue the monitoring of the flight deck 106. Returning to (304), if the data processor 202 does not determine that a change in the state of the flight deck 106 has occurred, then the flow also returns to (302) in order to continue monitoring the flight deck 106.

As described above, in one embodiment, the avionics subsystem also includes a buffer memory 204 that, for example, can be utilized to continuously store N-number of minutes (e.g., N=5, 15, 30, 60, etc.) of vehicle data in preparation for transmission in, for example, a first-in-first-out (FIFO) format. Note that the buffer memory 204 can be implemented as a separate component, or it may be incorporated into, and as a component of, the data transmitter 102, the flight deck 106, or the data processor 202.

Returning to FIG. 1, the data transmitter 102 can be configured to transmit the vehicle data either manually or automatically. For example, the data transmitter 102 can transmit the vehicle data in response to an activation input from the flight crew (e.g., a button accessible to the flight crew). Alternatively, for example, the data transmitter 102 can automatically transmit the vehicle data in response to one or more electronic inputs. Such automatic inputs can include, for example, a crew alerting system (CAS) message, a flight deck alarm, a failure message, and/or a weight-on-wheels (WOW) signal, just to name a few.

For example, the data transmitter 102 may be implemented utilizing any suitable electronic component configurable to implement one-way data transmissions. In some embodiments, the data transmitter 102 can be implemented utilizing an Aircraft Interface Device (AID), a Quick Access Recorder (QAR), or a Flight Data Recorder (FDR). In any event, for this exemplary embodiment, the data transmitter 102 is configured to transmit the vehicle data to a ground-based transceiver 112 via a high-speed data pipe 110, such as, for example, a high-speed satellite communications data pipe, a communications satellite 114, and a satellite communication (SATCOM) link 116. For example, in one embodiment, the high-speed data pipe 110 can be implemented utilizing the "JetWave" high-speed satellite communications data pipe that transmits data over the Ka-band of frequencies.

For this exemplary embodiment, the ground-based transceiver 112 is coupled to and in operable communication with the data transmitter 102 via the communications satellite 114, and is configured to receive and re-transmit, in real-time, the vehicle data transmitted by the data transmitter 102. In some embodiments, the ground-based transceiver 112 can communicate with the data transmitter 102 via more than one communications satellite in, for example, a series configuration of satellites. In some embodiments, the ground-based transceiver 112 can be implemented as separate receiver and transmitter components.

For this exemplary embodiment, the ground-based transceiver 112 is coupled to and in operable communication with a security/firewall interface 114 via an interconnected computer network 118, such as, for example, the Internet, and a plurality of suitable communication links 115, 117. In turn, the security/firewall interface 114 is coupled to and in operable communication with a computer processor 120 via a data link 119. In one embodiment, the computer processor 120 is configured to buffer the vehicle data received via the data link 119, and process the received data into a format suitable for viewing via a display at the flight simulator 122. In a second embodiment, the computer processor 120 can be configured to buffer the vehicle data received via the data link 119, and re-transmit the data to the flight simulator 122 to be processed there for viewing. In any event, for this example embodiment, the computer processor 120 is configured to receive, in real-time, the vehicle data transmitted by the ground-based transceiver 112, and to re-transmit, in real-time, the received vehicle data to the flight simulator 122 via a suitable data link 121.

As such, in response to the vehicle data transmitted from the flight deck 106, the flight simulator 122 is enabled to receive and replicate, in real-time, the transmitted data associated with the automatic or manual response input activated at the flight deck 106. As such, the flight simulator 108 is enabled to replicate, in real-time, the functions that are currently presented at the flight deck 106. Consequently, the flight simulator 108 can implement suitable control functions that will enable the ground-based CSS 124 to navigate (e.g., utilizing rewind, forward, live controls) through the vehicle data received and thus more efficiently and effectively utilize the data to diagnose and resolve the avionics system's problem or failure involved.

Notably, also as illustrated in the embodiment depicted in FIG. 1, the flight crew 126 and the ground-based CSS personnel 124 can still communicate in real-time via conventional voice communications (e.g., satellite communications). This capability enables the ground-based CSS personnel 124 to maintain communications with the flight crew 126 while diagnosing the problem or failure involved. Consequently, for example, the ground-based CSS personnel 124 can instruct the flight crew 126 to perform certain maintenance tasks so the CSS personnel 126 can monitor their effects instead of relying on the flight crew's description of the effects.

Figure 4:
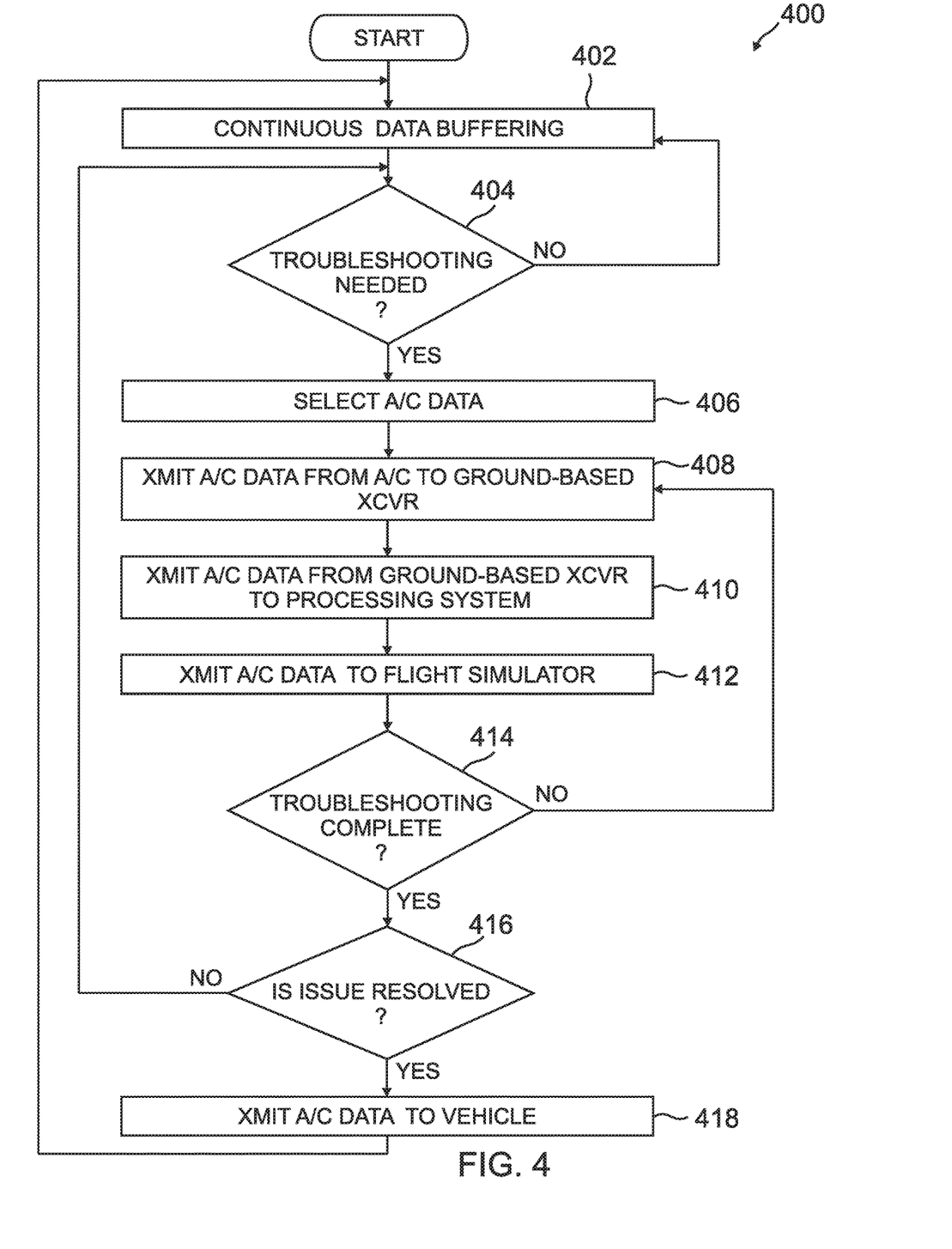
FIG. 4 is a flow diagram illustrating a second method that can be utilized to implement one example embodiment of the present invention.

FIG. 4 is a flow diagram illustrating a method 400, which can be utilized to implement a second example embodiment of the present invention. Referring to FIGS. 1-4 for this exemplary embodiment, the method begins with the buffer memory 204 updating and continuously storing vehicle (e.g., aircraft) data (402). The method then determines if the stored aircraft data indicates that a failure or a maintenance issue exists and whether or not troubleshooting or diagnosing is required by the CSS (404). If (at 404) the determination is made that troubleshooting is required, then in response to a manual or automatic initiation signal, the appropriate subset of the stored vehicle data corresponding to the failure or maintenance issue is selected for diagnosis (406). However, if (at 404) the determination is made that troubleshooting is not required, the flow returns to (402). Returning to (406), the data transmitter 102 transmits the selected vehicle data from the vehicle (e.g., either in-flight or on the ground) to the ground-based transceiver 112 in real-time (408). Next, the ground-based transceiver 112 re-transmits the selected vehicle data to the processing system 120 (410). In turn, the processing system 120 re-transmits the selected vehicle data to the flight simulator 122 in real-time (412). The method then determines if the troubleshooting associated with the selected vehicle data is completed (414), and if so, the method then determines if the failure or maintenance issue is resolved (416). If (at 416) the failure or maintenance issue is determined resolved, the method transmits the data associated with the resolved failure or maintenance issue to the vehicle (418), and the flow then returns to (402). However, if (at 414), the method determines that the troubleshooting in not completed, then the flow returns to (408). Returning to (416), if the method determines that the failure or maintenance issue is not resolved, then the flow returns to 404.

The system and method described above enable ground-based CSS personnel to, for example, diagnose and resolve vehicle avionics system problems in-flight and/or immediately upon landing. The system and method enable ground-based CSS personnel to perceive and understand avionics problems observed during flights and thereby more efficiently and effectively diagnose, dispose of and resolve the problems involved. As such, the system and method enable the CSS personnel to obtain a more complete picture of the state of the flight deck avionics (e.g., as viewed by the flight crew) and thereby access the relevant vehicle data, in real-time, in order to help make more accurate diagnoses when such problems are first observed, which serves to significantly enhance the shared awareness between the flight crew and the CSS personnel of the observed problems being discussed.

It should be understood that elements of the above-described embodiments and illustrative figures may be used in various combinations with each other to produce still further embodiments which are explicitly intended as within the scope of the present disclosure.

EXAMPLE EMBODIMENTS

Example 1 includes a system, comprising: a data transmitter configured to transmit vehicle data associated with a vehicle in real-time; a deck associated with the vehicle and configured to exhibit a response to the vehicle data; a transceiver coupled to the data transmitter, the transceiver configured to receive and re-transmit the vehicle data in real-time; a processing system coupled to the transceiver, the processing system configured to receive and re-transmit the vehicle data in real-time; and a simulator coupled to the processing system, the simulator configured, in response to the vehicle data, to replicate the exhibited response of the deck in real-time.

Example 2 includes the system of Example 1, wherein the vehicle is at least one of an airborne vehicle, a water-based vehicle, or a land-based vehicle.

Example 3 includes the system of any of Examples 1-2, wherein the deck is a flight deck of an aircraft.

Example 4 includes the system of any of Examples 1-3, wherein the transceiver is a ground-based transceiver.

Example 5 includes the system of any of Examples 1-4, wherein the data is flight maintenance data.

Example 6 includes the system of any of Examples 1-5, wherein the deck is a flight deck of an aircraft, and the data transmitter is coupled to the flight deck via an aircraft standard communications bus (ASCB) or an aircraft communications bus (ACB).

Example 7 includes the system of any of Examples 1-6, wherein the data transmitter is coupled to the transceiver via a high-speed data pipe.

Example 8 includes the system of any of Examples 1-7, wherein the data transmitter is coupled to a buffer memory via an ASCB.

Example 9 includes the system of any of Examples 1-8, wherein the data transmitter is configured to retrieve flight data from a buffer memory associated with a flight deck.

Example 10 includes the system of any of Examples 1-9, wherein the transceiver is configured to receive and re-transmit satellite communications.

Example 11 includes a method, comprising: receiving, at a ground-based transceiver in real-time, flight data from an in-flight vehicle, the in-flight vehicle including a flight deck configured to exhibit a response to the flight data; transmitting, in real-time, the flight data from the ground-based transceiver to a processing system; and transmitting, in real-time, the flight data from the processing system to a flight simulator that is configured, in response to the flight data, to replicate, in real-time, the exhibited response of the flight deck of the vehicle.

Example 12 includes the method of Example 11, wherein the receiving the flight data from the in-flight vehicle comprises receiving the flight data from at least one of an aircraft, a spacecraft or a satellite.

Example 13 includes the method of any of Examples 11-12, wherein the receiving the flight data from the in-flight vehicle at the ground-based transceiver comprises transmitting the flight data from the in-flight vehicle to a communications satellite, and the communications satellite re-transmitting the flight data to the ground-based transceiver.

Example 14 includes the method of any of Examples 11-13, wherein the receiving the flight data from the in-flight vehicle at the ground-based transceiver comprises transmitting the flight data from the in-flight vehicle to a communications satellite via a high-speed data pipe, and the communications satellite re-transmitting the flight data to the ground-based transceiver.

Example 15 includes the method of any of Examples 11-14, wherein the transmitting the flight data from the ground-based transceiver to the processing system comprises transmitting the flight data from the ground-based transceiver to an interconnected computer network, re-transmitting the flight data from the interconnected computer network to a firewall, and coupling the flight data from the firewall to the processing system.

Example 16 includes the method of any of Examples 11-15, further comprising: determining if an indication exists that the flight data requires troubleshooting; if the indication exists that the flight data requires troubleshooting, selecting a subset of the flight data associated with the indication, and transmitting the subset of the flight data from the in-flight vehicle to the flight simulator for troubleshooting in real-time.

Example 17 includes an avionics subsystem, comprising: a buffer memory configured to continuously store aircraft data; a flight deck coupled to the buffer memory and configured for aircraft data transfer therebetween; a data processor coupled to the flight deck, the data processor configured to monitor a state of the flight deck and in response to a current state of the flight deck, select a subset of the aircraft data from a data bus coupled to the data processor and the buffer memory; and a data transmitter coupled to the data bus and configured to transmit and thereby transfer the selected subset of the aircraft data to a flight simulator disposed externally to the avionics subsystem.

Example 18 includes the avionics subsystem of Example 17, wherein the data bus is an ASCB or an ACB.

Example 19 includes the avionics subsystem of any of Examples 17-18, wherein the buffer memory is configured to store a predetermined amount of the aircraft data.

Example 20 includes the avionics subsystem of any of Examples 17-19, wherein the selected subset of the aircraft data includes data associated with a response of the flight deck to the aircraft data.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system, comprising:
   a flight deck associated with a vehicle and configured to exhibit a response to vehicle data;
   a data processor configured to determine that a subset of the vehicle data is associated with a change in state occurring in the flight deck, and select and store the subset of the vehicle data as buffered vehicle data in a buffer;
   a data transmitter configured to transmit the buffered vehicle data in response to one or more inputs, the one or more inputs being an activation input from a crew of the vehicle and/or one or more electronic inputs comprising a crew alerting system (CAS) message, an alarm, a failure message, and/or weight on wheels signal;
   a transceiver coupled to the data transmitter, the transceiver being configured to receive and re-transmit the buffered vehicle data in real-time;
   a processing system coupled to the transceiver, the processing system being configured to receive and re-transmit the buffered vehicle data in real-time; and
   a flight simulator coupled to the processing system, the flight simulator being configured to navigate through the buffered vehicle data by replicating the exhibited response of the flight deck in response to receiving the buffered vehicle data.

2. The system of claim 1, wherein the vehicle is at least one of an airborne vehicle, a water-based vehicle, or a land-based vehicle.

3. The system of claim 1, wherein the vehicle is an aircraft.

4. The system of claim 1, wherein the transceiver is a ground-based transceiver.

5. The system of claim 1, wherein the vehicle data is flight maintenance data.

6. The system of claim 1, wherein the vehicle is an aircraft, and the data transmitter is coupled to the flight deck via an aircraft standard communications bus (ASCB) or an aircraft communications bus (ACB).

7. The system of claim 1, wherein the data transmitter is coupled to the transceiver via a high-speed data pipe.

8. The system of claim 1, wherein the data transmitter is coupled to the buffer via an aircraft standard communications bus (ASCB) to buffer the buffered vehicle data.

9. The system of claim 1, wherein the data transmitter is configured to transmit the buffered vehicle data by retrieving flight data from the buffer associated with the flight deck.

10. The system of claim 1, wherein the transceiver is configured to receive and re-transmit satellite communications.

11. A method, comprising:
- receiving, at a ground-based transceiver, buffered flight data from an in-flight vehicle, the in-flight vehicle including a flight deck configured to exhibit a response to the flight data;
- transmitting, in real-time, the buffered flight data from the ground-based transceiver to a processing system; and
- transmitting, in real-time, the buffered flight data from the processing system to a flight simulator, the flight simulator being configured to:
  - in response to receiving the buffered flight data, replicate the exhibited response of the flight deck of the vehicle; and
  - navigate, in response to control functions, through the buffered vehicle data.

12. The method of claim 11, wherein the receiving the flight data from the in-flight vehicle includes receiving the flight data from at least one of an aircraft, a spacecraft or a satellite.

13. The method of claim 11, wherein the receiving the buffered flight data from the in-flight vehicle at the ground-based transceiver includes:
- transmitting the buffered flight data from the in-flight vehicle to a communications satellite, and
- re-transmitting, by the communications satellite, the buffered flight data to the ground-based transceiver.

14. The method of claim 11, wherein the receiving the buffered flight data from the in-flight vehicle at the ground-based transceiver includes:
- transmitting the buffered flight data from the in-flight vehicle to a communications satellite via a high-speed data pipe, and
- re-transmitting, by the communications satellite, the buffered flight data to the ground-based transceiver.

15. The method of claim 11, wherein the transmitting the buffered flight data from the ground-based transceiver to the processing system includes:
- transmitting the buffered flight data from the ground-based transceiver to an interconnected computer network,
- re-transmitting the buffered flight data from the interconnected computer network to a firewall, and
- coupling the buffered flight data from the firewall to the processing system.

16. An avionics subsystem, comprising:
- a flight deck associated with a vehicle and configured to exhibit a response to vehicle data;
- a data processor coupled to the flight deck, the data processor configured to determine that a subset of the vehicle data is associated with a change in state occurring in the flight deck, and select and store the subset of the vehicle data as buffered vehicle data in a buffer; and
- a data transmitter configured to transmit the buffered vehicle data to a flight simulator in response to one or more inputs, the one or more inputs being an activation input from a crew of the vehicle and/or one or more electronic inputs comprising a crew alerting system (CAS) message, an alarm, a failure message, and/or weight on wheels signal, the flight simulator being configured to:
  - in response to receiving the buffered flight data, replicate the exhibited response of the flight deck of the vehicle; and
  - navigate, in response to control functions, through the buffered vehicle data.

17. The avionics subsystem of claim 16, wherein the buffer is configured to store a predetermined amount of the vehicle data.

\* \* \* \* \*